(12) United States Patent
Auclair

(10) Patent No.: US 8,168,021 B2
(45) Date of Patent: May 1, 2012

(54) PROCESS FOR ASSEMBLING A TIRE

(75) Inventor: Jacques Auclair, Cournon-d'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 409 days.

(21) Appl. No.: 12/384,160

(22) Filed: Apr. 1, 2009

(65) Prior Publication Data

US 2009/0188609 A1 Jul. 30, 2009

Related U.S. Application Data

(62) Division of application No. 11/313,557, filed on Dec. 20, 2005, now abandoned.

(30) Foreign Application Priority Data

Dec. 24, 2004 (FR) ..................................... 04 13955

(51) Int. Cl.
*B29D 30/26* (2006.01)
*B29D 30/30* (2006.01)

(52) U.S. Cl. ........ 156/130; 152/526; 152/562; 156/123; 156/126; 156/417

(58) Field of Classification Search ................ 156/123, 156/126, 130, 133, 414, 417–420, 406.4
See application file for complete search history.

(56) References Cited

U.S. PATENT DOCUMENTS 3,373,066 A * 3/1968 Hindin ........................... 156/133
(Continued)

FOREIGN PATENT DOCUMENTS

EP 312 300 4/1989
(Continued)

OTHER PUBLICATIONS

United States Office Action dated Dec. 2, 2008 of the prior U.S. Appl. No. 11/313,557.

*Primary Examiner* — Geoffrey L Knable
(74) *Attorney, Agent, or Firm* — Cozen O'Connor

(57) ABSTRACT

A process for assembling a tire, including producing a crown of said tire on a drum of variable diameter of a generally cylindrical form. The assembling process includes: positioning the drum at a first diameter D1; depositing a first crown belt ply N1 of reinforcement cables coated in a rubber mix forming a given angle α1 with a circumferential direction, by activating first and second holding devices to make an entire first crown belt ply N1 adhere to a surface of the drum; depositing a second crown belt ply N2 of reinforcement cables coated in a rubber mix forming a given angle α2 of an opposite sign to the angle α1 with the circumferential direction; making the second crown belt ply N2 adhere to the first crown belt ply N1; while keeping the first holding device in the preceding configuration, activating the second holding device so as to permit sliding of the first crown belt ply level with said second holding device; positioning the drum at a second diameter D2 greater than the first diameter D1; activating the second holding device so as to make the first and second crown belt plies adhere to the surface of the drum; depositing additional plies and profiled products to form the crown of the tire; and removing the crown from the drum.

5 Claims, 4 Drawing Sheets

U.S. PATENT DOCUMENTS

| | | | |
|---|---|---|---|
| 3,503,829 A | 3/1970 | Hans et al. | |
| 4,288,265 A * | 9/1981 | Pacciarini et al. | 156/126 |
| 4,928,742 A * | 5/1990 | Oku et al. | 152/534 |
| 4,976,804 A | 12/1990 | Kneip | |
| 6,080,256 A * | 6/2000 | Suzuki et al. | 156/110.1 |
| 2001/0000582 A1 | 5/2001 | Sergal et al. | |
| 2002/0096244 A1 | 7/2002 | Ahouanto et al. | |
| 2003/0051816 A1 | 3/2003 | Cavalotti et al. | |
| 2003/0168152 A1 | 9/2003 | Suda | |

FOREIGN PATENT DOCUMENTS

| | | | |
|---|---|---|---|
| EP | 0 862 986 A | | 9/1998 |
| FR | 2 037 520 | | 12/1970 |
| FR | 2 797 213 | | 2/2001 |
| GB | 1 309 693 | | 3/1973 |
| JP | 07-001603 A | | 1/1995 |
| JP | 2001 212889 A | | 8/2001 |
| JP | 2004-34613 A | * | 2/2004 |
| SU | 444690 A | | 7/1975 |

* cited by examiner

PROCESS FOR ASSEMBLING A TIRE

CROSS REFERENCE TO RELATED APPLICATION

This application is a Divisional of U.S. patent application Ser. No. 11/313,557, filed Dec. 20, 2005 now abandoned, which claims priority of France Patent Application No. 04/13955 filed on Dec. 24, 2004. The entire disclosure of U.S. patent application Ser. No. 11/313,557 is incorporated herein by reference.

FIELD OF THE INVENTION

The invention relates to the field of the manufacture of tires, and in particular the field of the manufacture of crown reinforcement belts. These crown reinforcement belts are usually composed of one or more plies stacked one on another. Each of these plies is formed from cables which are parallel to each other and are coated in a rubber-nature mix. These cables form a given angle with the circumferential direction of the tire. The cables may be constituted of one or more strands, which themselves are formed from unit cords made of textile or more generally of metal in the case of crown reinforcement plies.

BACKGROUND OF THE INVENTION

In order to impart the expected qualities to the tire, the reinforcement belts are generally formed of at least two plies the cables of which form, relative to the circumferential direction, angles having opposite signs, of absolute values which are close to one another but not necessarily identical. Once in place, these plies effect triangulation with the plies of the carcass reinforcement, the cables of which generally form an angle of 90° with the longitudinal direction.

According to the manufacturing processes commonly used in the tire industry, the crown reinforcement plies are laid after the carcass obtained in a first stage has been shaped, that is to say after a toric form has been imparted to the tire blank of substantially cylindrical form. Said carcass generally comprises a carcass reinforcement ply anchored at its two ends to rings for reinforcing the bead.

The belt plies are laid when the diameter of the blank is close to the definitive diameter of the tire. This diameter is calculated to permit insertion of said final blank in the vulcanisation press.

Another method consists of producing the whole of the crown on a cylindrical form referred to as a crown form, the diameter of which is also close to the definitive diameter, and on which are deposited in succession the crown reinforcement plies and the profiled elements constituting the crown section of the tire and comprising, inter alia, the tread. The finished crown is then transferred by a transfer ring to the carcass which, by conforming thereto, adheres to the inner part of the crown.

On the other hand, and still with the aim of improving the performance of the tires, the advantage of producing crown plies the reinforcement cables of which have angles which are variable over their length has been demonstrated. More particularly, the angle of the reinforcing threads relative to the longitudinal direction is less at the centre than on the edges of the ply. The effect of this S-shaped arrangement is to facilitate the flattening of the tire by improving the comfort and the stability, and to reduce the wear phenomena at the ply edge. This type of tire is described by way of example in patent FR 2 037 520 or alternately in patent EP 312 300.

The mechanisms linked to the triangulation of the plies are widely known to the person skilled in the art, and are the subject of numerous publications, among which mention will be made of publication FR 2 797 213 of the Applicant.

A process for producing this particular form of crown belt is set forth in the aforementioned patent FR 2 037 520. It consists of depositing two crown reinforcement plies one on the other, making them adhere strongly over their entire length and over part of their width, and stretching the whole in the longitudinal direction. One variant of this process consists of including a separating element over part of the width, so as to permit sliding of the plies and to define the zones of the ply edge in which it is desired to modify this angle. Once stabilised, the ply is laid directly on the carcass of the tire which has beforehand been curved into its toric form.

It will be observed that this process necessitates assembling the plies on an independent station, but also that producing the join of the two ends of the assembly thus produced may prove awkward owing to the superposition of plies of different angles.

The process described in application FR 2 797 213 makes it possible to produce a crown having the characteristics set forth above, but it is accompanied by the deradialisation of the carcass reinforcement ply beneath the crown zone.

SUMMARY OF THE INVENTION

The invention which is the subject of the present application relates to a process and a device for producing an assembly on a crown form of the crown reinforcement plies the cables of which form variable angles with the circumferential direction over their length, while precisely controlling the geometry and the position on the drum for laying the ring thus obtained.

To this end, it is proposed to effect separately the assembly of the elements constituting the crown of the tire on a drum of variable diameter of generally cylindrical form, comprising a set of first holding means arranged circumferentially on the equator of said drum and suitable for making that part of the ply arranged level with these means adhere to the drum and characterised in that it comprises a set of second holding means which are suitable for making that part of the ply placed level with said second means alternately adhere to or slide freely on the drum, and which are arranged circumferentially and axially on either side of the equator over the entire surface of said drum.

The crown belt plies are assembled by positioning the drum at a first diameter. The first crown belt reinforcement ply, the reinforcement cables of which form a given angle with the circumferential direction, is deposited while activating the first and second means so as to make the entire ply adhere to the surface of the drum.

Then the second crown belt ply, composed of reinforcement cables forming with the circumferential direction a given angle of the opposite sign to the angle of the reinforcing threads forming the first ply, is deposited. Then the second ply is made to adhere strongly to the first ply.

While keeping the first means in the preceding configuration, the second means are activated so as to permit sliding of the first ply level with said second means, and the drum is positioned at a second diameter greater than the first diameter.

It has been shown that, in order to retain a precise alignment of the axis of the plies with the circumferential direction, it was necessary to hold this central part securely during the shaping operation while promoting sliding of those parts located on either side of this axis so as to permit triangulation of the plies involving a variation in their width and in the angle of the cables forming them.

Thus everything happens as if each cable were performing a rotary movement about its central part, said central part being held securely in position on the surface of the drum by said first means. Furthermore, the free sliding of the lateral parts promotes the triangulation of the plies in a homogeneous and reproducible manner over the entire circumference of the drum.

It thus becomes easy to continue the finishing of the crown of the tire by depositing the rest of the products constituting said crown on the same drum. These products may comprise other crown reinforcement plies which may form a possibly zero angle with the circumferential direction but also rubber profiled elements, including the tread of the tire.

It is therefore not necessary to effect the triangulation of the crown reinforcement plies on a different means from the one used for building the crown. Furthermore, the use of this device proves particularly advantageous in precisely controlling the geometric position of the products constituting the crown relative to each other, but also relative to a reference on the drum.

BRIEF DESCRIPTION OF THE DRAWINGS

The final production of the tire then takes place entirely conventionally by gripping the crown thus produced using a transfer ring and depositing it on the shaped carcass.

A drum in accordance with the invention is described briefly hereafter with reference to the figures, in which.

DETAILED DESCRIPTION OF THE EMBODIMENTS

Figure 1:
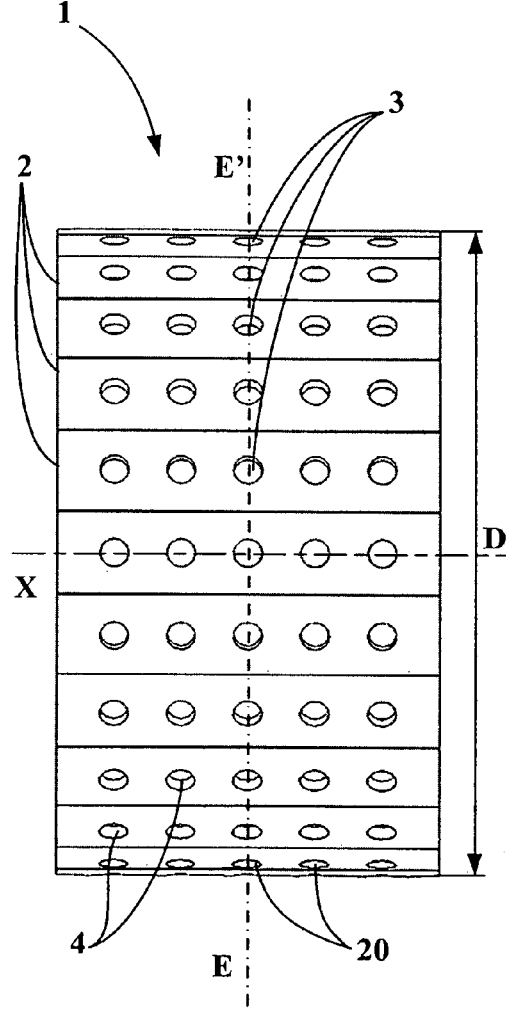
FIG. 1 is a diagrammatic front view of a drum in accordance with the invention positioned at its first diameter.

The drum 1 shown in FIG. 1 comprises a set of elements 2 arranged equidistantly about an axis of rotation XX'. These elements are radially mobile and make it possible to vary the substantially cylindrical surface of the drum from a first diameter D1 to a second diameter D2.

Each element 2 has in its axial direction receptacles 20, into which are placed the first holding means 3 and the second holding means 4 respectively.

The first holding means 3 are arranged axially in the middle of each of the elements 2, which makes it possible to form a set of first holding means arranged circumferentially on the equator EE' of the drum 1. The equator is defined as the intersection of a plane, perpendicular to the axis of rotation XX' of the drum and extending axially in the middle of the surface of the drum, with the cylinder formed by the surface of said drum.

Figure 7:
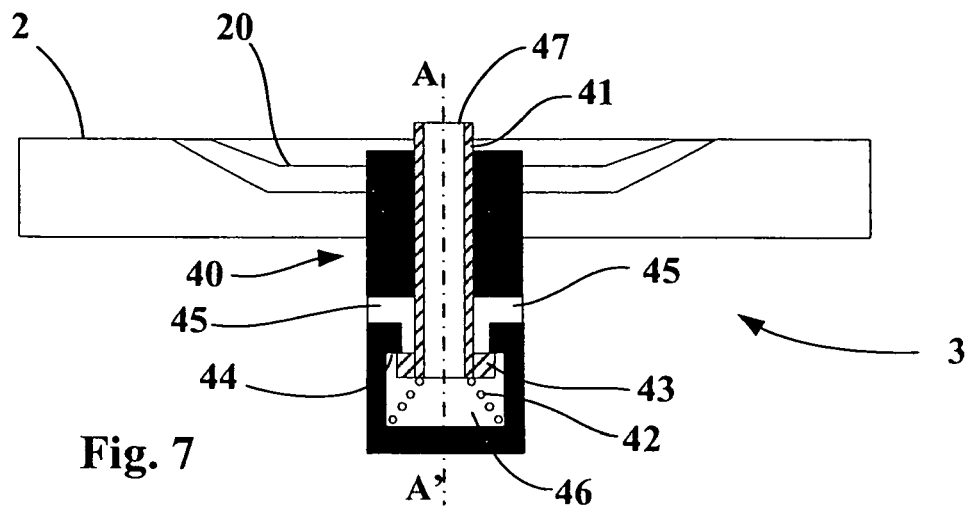
FIGS. 7 to 9 are diagrammatic views of the main phases of operation of the holding means.

An example of embodiment of a first holding means 3 is shown in FIG. 7 and can be likened to a tire valve 40. The body of the valve 40, of substantially radial axis AA', is arranged in the receptacle 20 of the element 2. The body of the valve 40 comprises a series of orifices 45 located on its lateral part. The orifices communicate with a chamber 46.

The body of the valve contains a tubular slider 41 which slides the same axis AA' and comprises at each of its ends a seat 43 and an outlet 47 respectively. The seat of the slider 43 lies on the bearing surface 44 under the action of the spring 42, and prevents air from passing between the orifices 45 and the chamber 46. The body of the slider 41 comprises a conduit which connects the chamber 46 and the outlet 47. The outlet 47 is arranged so as to be radially slightly to the outside of the plane formed by the surface of the element 2. The orifices 45 are connected to a vacuum source (not shown).

Figure 8:
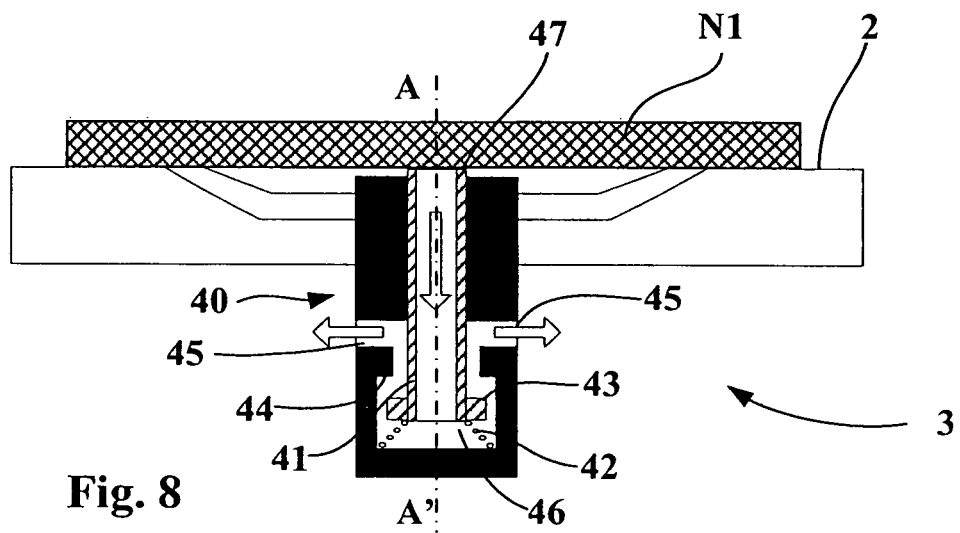

Thus, as shown in FIG. 8, by depositing a ply N1 on the surface of the element 2, the slider 41 is retracted by forcing it back radially towards the inside. The effect of this action is to detach the seat 43 of the slider from its bearing surface 44, and to connect the chamber 46 and the orifices 45, which produces a partial vacuum at the outlet 47 of the slider. The arrows in FIG. 8 show the circulation of the air. The result is an adhesion force due to partial vacuum which flattens the ply against the surface of the drum, depriving it of any opportunity of axial displacement in the immediate vicinity of the outlet 47.

Figure 9:
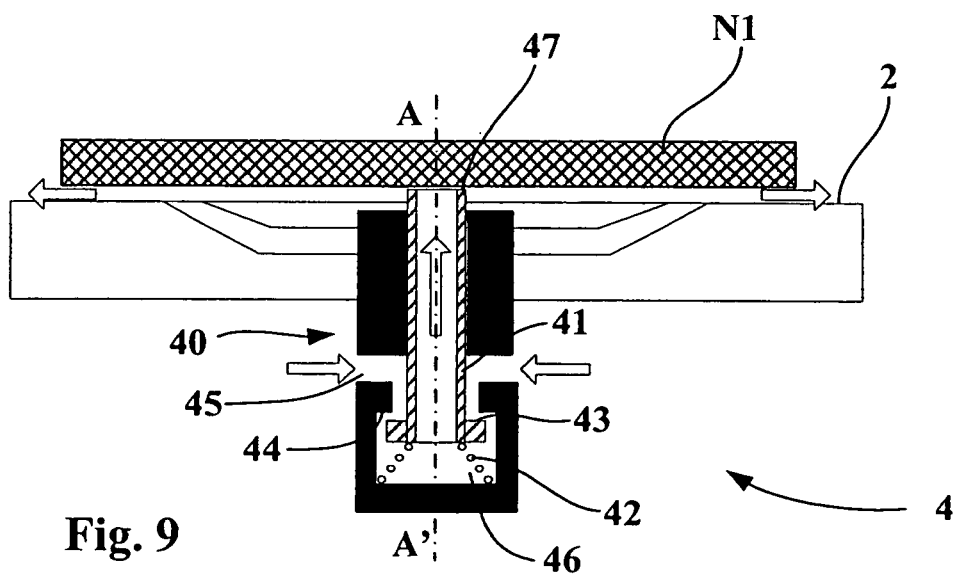

The second means are similar to the first means. They are arranged axially on either side of the equator EE'. They nevertheless differ from the first means 3 in that the orifices 45 may be connected alternately to a vacuum source and function like suction cups, as explained previously, or to a pressurised air source. In this second case, the operation of the second means is illustrated in FIG. 9.

The slider 41 is held in the retracted position by the action of the ply N1 on the outlet 47. The air can then circulate freely in the direction of the arrows from the orifices 45 towards the outlet 47. As a result, a thin cushion of air is created between the surface of the element 2 and the ply N1, the effect of which is to promote the sliding of the ply on the surface of the drum located in the immediate vicinity of the outlet 47.

The setting of the spring 42 and of the air pressure at the entrance to the orifices 45 is adjusted so as to permit closure of the communication between the chamber 46 and the orifices 45 when the ply N1 is removed.

The realisation of first means and second means based on pneumatics valves proves particularly simple to carry out. However, considering first means which are electromagnetic in nature, which may prove of particularly high performance when the belt plies of the crown are metal plies, is not ruled out.

Figure 2:
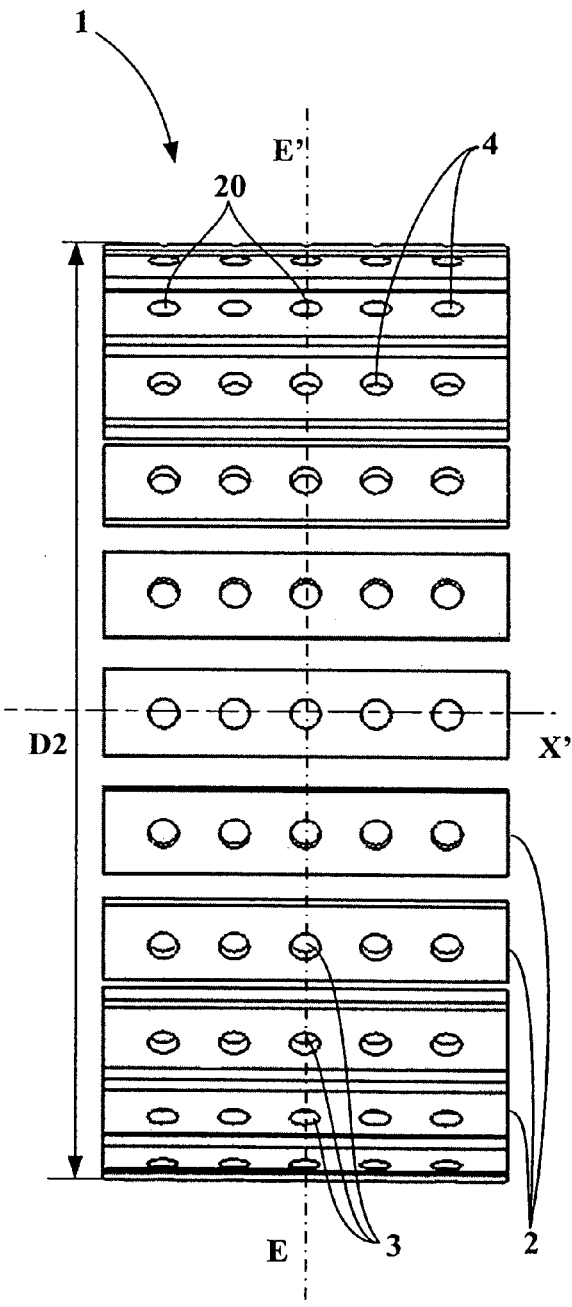
FIG. 2 is a diagrammatic front view of a drum in accordance with the invention positioned at its second diameter.
Figure 3:
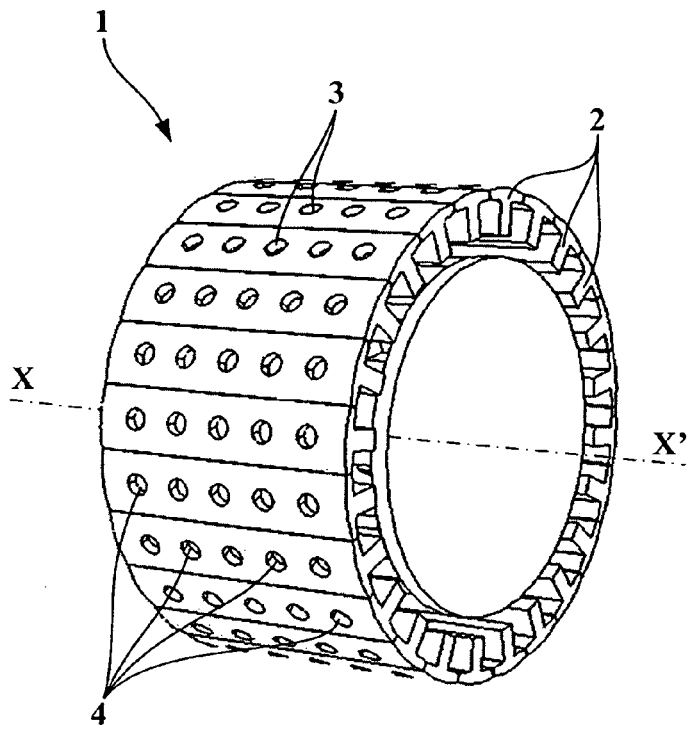
FIG. 3 is a diagrammatic perspective view of the drum positioned at its first diameter.
Figure 4:
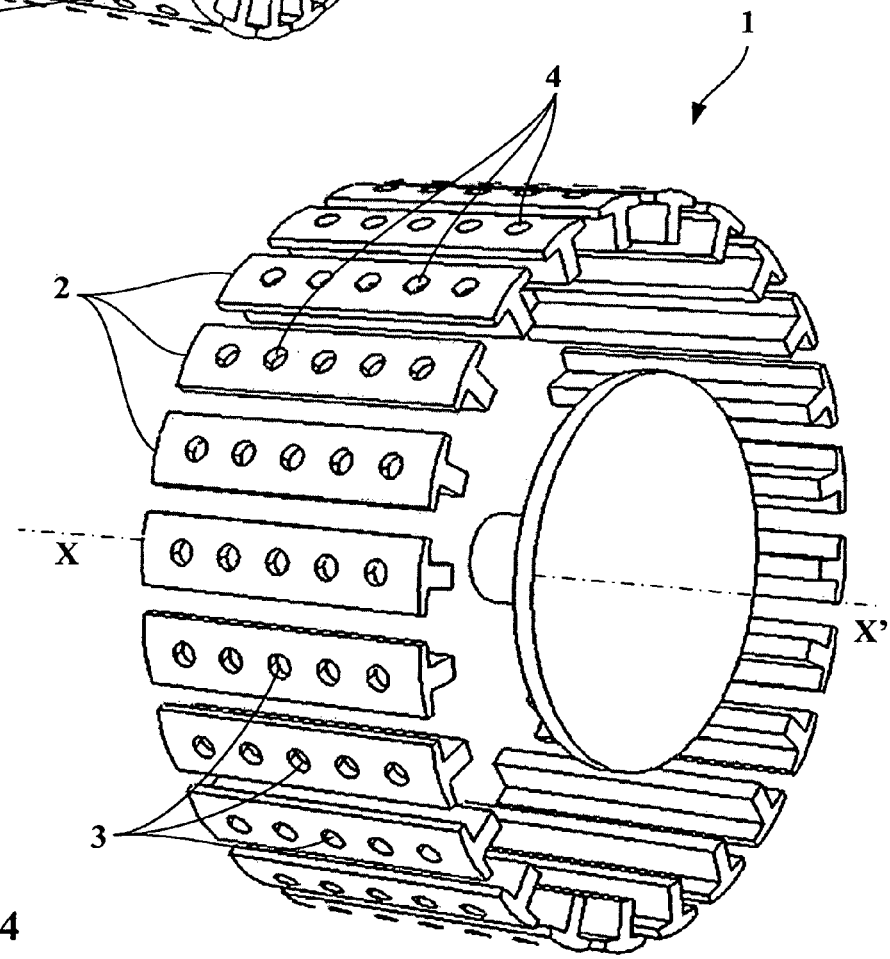
FIG. 4 is a diagrammatic perspective view of the drum positioned at its second diameter.

FIG. 2 shows the drum 1 positioned at its diameter D2, and FIGS. 3 and 4 show the drum 1 at the diameters D1 and D2 in a perspective view. The mechanisms controlling the radial movement of the elements 2, and also the means enabling the drum to be supported and caused to rotate about the axis XX' are widely known to the person skilled in the art and are not the subject of the present description, and so are not shown in the figures.

Figure 5:
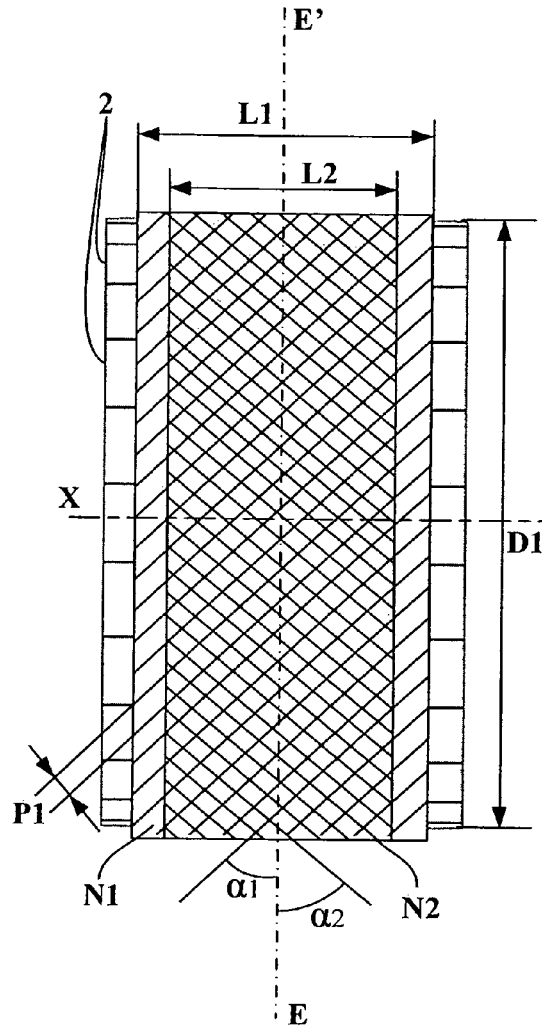
FIG. 5 is a front view of a drum at its first diameter on which crown reinforcement plies have been deposited.
Figure 6:
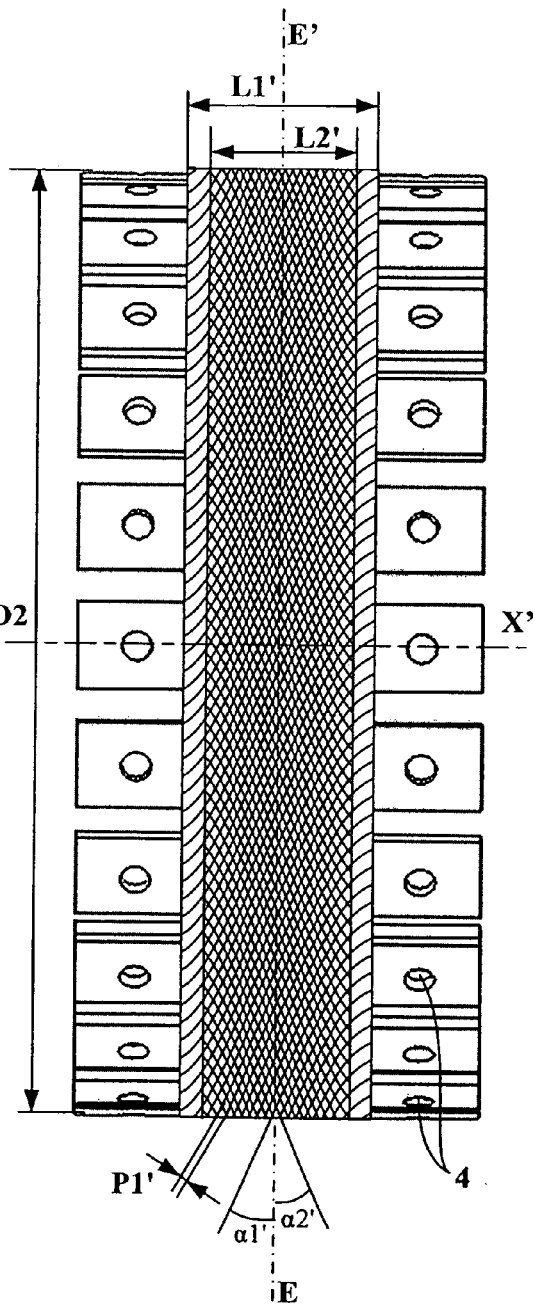
FIG. 6 is a front view of a drum at its second diameter on which crown reinforcement plies have been deposited.

FIGS. 5 and 6 show, in diagrammatic view, the stages of the shaping of a crown reinforcement belt composed of two plies N1 and N2 of widths L1 and L2 respectively, L2 generally being less than L1. The reinforcement cables forming the plies form angles α1 and α2, of opposite signs, with the circumferential direction.

The drum 1 is positioned at a first diameter D1 and the orifices 45 of the second means are connected to a vacuum connection. By depositing the first reinforcement ply N1, the outlets 47 of the sliders 41 are forced back radially, the effect of which, as has previously been seen, is to keep the ply N1 securely in position on the surface of the drum 1. The centre of the ply is also made to coincide with the equator EE' so as to ensure the geometric alignment of the constituents of the tire relative to a known reference.

Then a second ply N2 is deposited. So that the triangulation of the plies takes place in accordance with the geometric laws set forth by way of example in the document FR 2 797 213 already cited, it is advisable to make the two plies adhere strongly to one another. It will be noted that holding the plies in position on the surface of the drum during this operation is a way of preserving the geometric alignment imparted at the time of laying the plies.

Once this operation is finished, it is then possible to activate the second means in the configuration enabling the ply to be slid onto the surface of the drum by connecting the orifices 45 of the second means to a pressurised air source. The first means remain in the previous position, so as to keep those parts of the crown reinforcement belt which are located level with the equator EE' securely in contact with the drum and to prevent any movement of the belt level with the first means. Holding the belt properly along the central circumference EE' of the drum makes it possible to maintain the geometric alignment of the plies relative to a fixed reference on the drum 1.

By bringing the diameter of the drum to the diameter D2, the triangulation of the plies, the width of which changes from L1 to L1' and from L2 to L2' respectively, is brought about. The angles $\alpha 1$ and $\alpha 2$ formed by the cables with the circumferential direction at the equator change respectively to the values $\alpha 1'$ and $\alpha 2'$ which are less than $\alpha 1$ and $\alpha 2$ respectively. These values $\alpha 1'$ and $\alpha 2'$ are substantially constant over the length of the cables, but it is observed that these angles increase greatly at each of the ends of the cables in the edge zone of the plies N1 and N2 to impart an S-shaped form to the cables of the plies. In practice, the difference between the angle formed by a cable with the circumferential direction at its ends may vary from 2° to 15° compared with the angle formed by the same cable with the circumferential direction at the centre of the ply.

Once the shaping of the belt has been carried out, the assembly of the rest of the components forming the crown of the tire takes place in conventional manner.

It is also observed that the pitch of the cables narrows. In other words, the distance between two consecutive cables substantially parallel to each other decreases during the phase of shaping the plies. And this phenomenon is more marked at the centre than on the ply edges.

The device as has just been described makes it possible to take advantage of this known phenomenon. This is because in reducing the pitch and increasing the cable density at the centre, the flexural strength of the crown is increased and the wear life of the tire improved.

This also makes it possible to adjust the pitch of the plies to just what is necessary. This is because, starting from a ply N1 having a given pitch P1, it is possible to produce belts having an infinite number of pitches by modifying the shaping ratio. The shaping ratio is equal to the ratio of the second diameter D2 and the first diameter D1. In practice, the shaping ratio may vary between 1.03 and 1.5.

Thus, given knowledge of the pitch P1 of the ply N1, the angle $\alpha 1'$, the width L1', the final pitch P1' of the ply N1 (or the cable density which it is desired to obtain at the centre of the tire) and the final diameter D2, it is easy consequently to adjust the width L1, the angle $\alpha 1$, and the laying diameter D1. In practice, it is possible to obtain a pitch P1' of between P1' and 0.75*P1.

This method of implementation makes it possible, at the same time, to simplify the industrial complexity by reducing the reference number of plies of different pitches P1, and to give additional room for manoeuvre in the choice of cables which it becomes possible to select from among cables of lesser diameter, the use of which is permitted by increasing the density by shaping, in accordance with the process which is the subject of the invention, so as to obtain a structural resistance similar to that which would have been obtained with cables of greater strength and of a greater pitch.

What is claimed is:

1. A process for assembling a tire, comprising producing a crown of said tire on a drum of variable diameter of a generally cylindrical form, said drum comprising:
    a set of first holding means arranged circumferentially at an equator EE' of said drum and operable to make a part of a ply arranged level with the first holding means adhere to the drum, and
    a set of second holding means arranged circumferentially and axially on either side of the equator EE' over an entire surface of said drum and operable to make a part of a ply placed level with said second holding means alternately adhere to or slide freely on the drum, the assembly process comprising the following steps performed in order from (1) to (9):
    (1) positioning the drum at a first diameter D1,
    (2) depositing a first crown belt ply N1 of reinforcement cables coated in a rubber mix forming a given angle $\alpha 1$ with a circumferential direction, by activating the first and second holding means so as to make an entire first crown belt ply N1 adhere to a surface of the drum,
    (3) depositing a second crown belt ply N2 of reinforcement cables coated in a rubber mix forming a given angle $\alpha 2$ of an opposite sign to the angle $\alpha 1$ with the circumferential direction,
    (4) making the second crown belt ply N2 adhere to the first crown belt ply N1, while maintaining positions of the first holding means and the second holding means to adhere the entire crown belt to the surface of the drum,
    (5) activating the second holding means so as to permit sliding of lateral edges of the first crown belt ply level with said second holding means while maintaining the position of the first holding means so as to adhere the parts of the crown belt plies which are located level with the equator to the surface of the belt,
    (6) positioning the drum at a second diameter D2 greater than the first diameter D1,
    (7) activating the second holding means so as to make the first and second crown belt plies adhere to the surface of the drum,
    (8) depositing additional plies and profiled products to form the crown of the tire, and
    (9) removing the crown from the drum by deactivating the first and second holding means.

2. The assembly process according to claim 1, wherein a shaping ratio of the second diameter D2 to the first diameter D1 is between 1.03 and 1.5.

3. The assembly process according to claim 2, wherein an angle formed with the circumferential direction by a cable at its two ends is greater than an angle formed with the circumferential direction by the same cable in its central part.

4. The assembly process according to claim 3, wherein the angle formed with the circumferential direction by the cable at its two ends is greater by 2° to 15° than the angle formed with the circumferential direction by the same cable in its central part.

5. The assembly process according to claim 1, wherein the step of removing the crown comprises gripping the crown with a transfer ring and depositing the crown on a tire blank of toroidal form.

* * * * *